United States Patent [19]
Peterson et al.

[11] Patent Number: 4,670,342
[45] Date of Patent: Jun. 2, 1987

[54] METHOD OF MAKING ELECTRICAL INDUCTIVE DEVICES FOR USE IN HERMETIC REFRIGERANT ATMOSPHERES

[75] Inventors: Marvin A. Peterson; Raymond M. Mooney, both of Fort Wayne, Ind.

[73] Assignees: General Electric Company, Fort Wayne, Ind.; The Valspar Corporation, Minneapolis, Minn.

[21] Appl. No.: 721,072

[22] Filed: Apr. 8, 1985

[51] Int. Cl.$^4$ .................. D02G 3/00; C08K 5/34; C08G 69/26; H05K 5/06

[52] U.S. Cl. .................. 428/377; 174/17.06; 174/17 LF; 174/17 GF; 336/15; 336/177; 336/213; 427/116; 427/120; 427/178; 524/81; 524/104; 528/335; 528/336; 528/339; 528/342; 528/350; 528/351; 528/353

[58] Field of Search .................. 427/116, 120, 178; 174/110 SR, 110 N, 17.06, 17 LF, 17 GF; 428/377, 906; 336/15, 177, 213; 524/81, 104; 528/335, 336, 339, 342, 350, 351, 353

[56] References Cited

U.S. PATENT DOCUMENTS

| | | | |
|---|---|---|---|
| 2,868,159 | 1/1959 | Lit et al. | 118/125 |
| 3,607,553 | 9/1971 | Fritzsche | 156/380 |
| 3,652,500 | 3/1972 | Peterson | 427/120 |
| 3,663,510 | 5/1972 | Peterson | 427/120 |
| 3,778,411 | 12/1973 | Emerick et al. | 260/65 |
| 3,891,601 | 6/1975 | Peterson et al. | 260/47 CP |
| 3,915,997 | 10/1975 | Ladd | 260/346.8 |
| 3,925,313 | 12/1975 | Kojima et al. | 260/47 CP |
| 3,952,084 | 4/1976 | Edelman et al. | 427/120 X |
| 3,964,525 | 6/1976 | Arnold et al. | 140/92.1 |
| 4,004,062 | 1/1977 | Peterson | 428/383 |
| 4,073,788 | 2/1978 | Peterson | 427/120 |
| 4,107,355 | 8/1978 | Merchant et al. | 427/120 |
| 4,145,474 | 3/1979 | Kertscher et al. | 427/120 X |
| 4,170,684 | 10/1979 | Schmidt et al. | 427/120 X |
| 4,208,464 | 6/1980 | Ishizuka et al. | 427/116 X |

*Primary Examiner*—Thurman K. Page
*Attorney, Agent, or Firm*—John M. Stoudt

[57] ABSTRACT

A method for making an electrical inductive device for use in hermetic atmospheres which incorporate refrigerants such as halogenated methane compositions, for example refrigerant R-22, monochlorodifluoromethane. The device may be a wound coil device formed of magnet wire, the enamel coating of which has resistance to blistering when exposed to refrigerants under saturated conditions at temperatures up to about 200° or 210° C. and above. The enamel coating composition or wire enamel is formed as the reaction product of 1,2,3,4-butanetetracarboxylic dianhydride, optionally with an aromatic dianhydride, and a diamine such as p,p'-methylenedianiline or p,p'-oxydianiline, in an organic solvent such as N-methyl-2-pyrrolidone.

25 Claims, No Drawings

METHOD OF MAKING ELECTRICAL INDUCTIVE DEVICES FOR USE IN HERMETIC REFRIGERANT ATMOSPHERES

BACKGROUND OF THE INVENTION

1. Field of the Invention

The present invention relates to a method for making an improved hermetic electrical inductive device for use in an hermetic atmosphere which incorporates halogenated methane compositions such as refrigerants, and more particularly to a method for making hermetic devices including coils wound of magnet wire having resistance to blistering when exposed to R-22 or like refrigerants under saturation conditions at temperatures up to and above about 210° C.

2. Brief Description of the Prior Art

Stalled or stopped electrical inductive devices such as motors operating in hermetic atmospheres including refrigerants, for example R-22 or monochlorodifluoromethane, often reach temperatures as high as 200° C. or 210° C. during startups. Field failures generally exhibit blistered wire windings, which have been observed to result from the refrigerant in the film being exposed to the high temperatures.

A wide variety of polymer varnish or enamel coatings for magnet wire, including polyesters, polyesterimides, and polyamideimides, are well known and widely used. See, for example, U.S. Pat. No. 3,652,500, issued Mar. 28, 1972, to M. A. Peterson for "Process for Producing Polyamide Coating Materials by Endcapping"; U.S. Pat. No. 3,663,510, issued May 16, 1972, to M. A. Peterson for "Process for Producing Polyamide Coating Materials"; U.S. Pat. No. 4,004,062, issued Jan. 18, 1977, to M. A. Peterson for "Aqueous Polyester Coating Composition;" and U.S. Pat. No. 4,073,788, issued Feb. 14, 1978, to M. A. Peterson, for "Partially Imidized Polyamide-acid Polymers, Aqueous Coating Compositions, Coated Wire and Method, and Partially Imidized Intermediate." The disclosures of the foregoing patents are incorporated herein by reference and made a part hereof. In general the polyesterimide, polyester, and polyamideimide overcoated polyesters, described in the aforementioned and other patents do not exhibit blister resistance when exposed to halogenated methane and ethane refrigerants, particularly the methane or R-22 refrigerants, in an hermetic environment at temperatures in the range of about 150° C., to about 210° C. While many of the polyimides described in the aforementioned patents do exhibit blister resistance when saturated with the refrigerant composition at high temperatures, they are not cost effective, both from the standpoint of the raw materials utilized and the solvent utilized.

OBJECTS AND SUMMARY OF THE INVENTION

It is the principal object of the present invention to provide a method for making an electrical inductive device, such as a motor, for use in an hermetic atmosphere incorporating halogenated refrigerants, and wherein the temperature can reach 210° C. or higher, without blistering of the enamel coatings on the magnet wire or other components of the electrical device. A related object of the present invention is to produce an improved magnet wire by coating a wire substrate with a composition capable of producing a blister resistant magnet wire when coils of the magnet wire are exposed to refrigerant R-22 or similar materials at temperatures up to about 210° C., and utilize the same in an hermetic motor.

Applicants have discovered a blister resistant composition which has not heretofore been used for electrical devices in hermetic atmospheres which incorporate methane refrigerants. The present invention is accomplished by the use, in an electrical device, of magnet wire or other substrates having an enamel coating which is resistant to blistering when exposed to halogenated refrigerants under saturated conditions at temperatures in the range up to about 210° C. It is believed that the enamel coating will be blister free even above about 210° C.

The present method comprises a wire substrate with a coating composition comprising a polyamide-acid reaction product of 1,2,3,4-butanetetracarboxylic dianhydride, alone or with the inclusion of select other dianhydrides, such as aromatic or cyclic dianhydrides, and a diamine, in a solvent, and curing said coating to produce a polyimide polymer coating on said wire substrate, which coating has been discovered to be resistant to blistering, as well as cost effective. The coating composition includes the reaction product specifically of 1,2,3,4-butanetetracarboxylic dianhydride, and a diamine. This dianhydride is also known as meso-1,2,3,4-butanetetracarboxylic dianhydride or, alternatively, as [3,3'-bifuran]-2,2',5,5'-tetrone. The compound is abbreviated for convenience as BTCDA, and has the general formula:

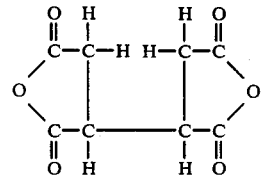

The diamine reactant may be any appropriate diamine, preferably an aromatic diamine, such as p,p'-methylenedianiline (MDA) or p,p'-oxydianiline (ODA). A wide variety of diamines are useful, however, as described in the foregoing references.

DESCRIPTION OF THE PREFERRED EMBODIMENT

In accordance with the present invention, electrical devices such as wound coil electromotive devices or motors incorporating magnet wire having resistance to blistering when exposed to refrigerants such as refrigerant R-22 (monochlorodifluoromethane) or refrigerant R-12 (dichlorodifluoromethane) are utilized at temperatures which may reach as high as 210° C., in an hermetic atmosphere including or incorporating such refrigerants, with little if any evidence of blistering of the magnet wire enamel. Such magnet wire is produced by coating a wire substrate with a magnet wire enamel comprising a polyimide polymer produced as the reaction product of 1,2,3,4-butanetetracarboxylic dianhydride and a diamine, in the molar ratio of about 1 to 1, in an organic solvent, such as N-methyl-2-pyrrolidone. The dianhydride and diamine are reacted under exothermic conditions, at a temperature in the range of about 50°–80° C., to an imidization level between 0 and about 2%. The resulting product is a polyamide-acid coating composition in a suitable solvent. By applying the polyamide-acid composition to magnet wire in a wire tower and curing the coating composition by heating to remove water, a polyimide enamel coating is produced on the magnet wire.

The dianhydride is specifically 1,2,3,4-butanetetracarboxylic dianhydride (BTCDA). This compound has the formula:

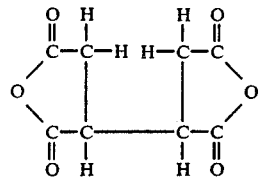

and is described in detail in U.S. Pat. No. 3,915,997, issued Oct. 28, 1975, to J. R. Ladd, for "Method for Making Meso-1,2,3,4-butanetetracarboxylic Dianhydride". The disclosure of U.S. Pat. No. 3,915,997 is incorporated herein and made a part hereof by this reference. Where desired, minor amounts up to about 50%, of other dianhydrides, such as aromatic or cyclic dianhydrides may be incorporated into the coating composition. Suitable aromatic dianhydrides which may be admixed with the 1,2,3,4-butanetetracarboxylic dianhydride include 3,3',4,4'-benzophenonetetracarboxylic dianhydride (BTDA), pyromellitic dianhydride (PMDA), 4,4'-(2-acetoxy-1,3-glyceryl)bis-anhydro trimellitate (AGTA), and 2,2-bis[4-(3,4-dicarboxyphenoxy)phenyl]propane dianhydride (BPADA).

The diamines can be selected from a wide variety of diamines, including aromatic diamines such as p,p'-methylenedianaline (MDA) and p,p'-oxydianiline (ODA). These diamines have the general formula $H_2N-RNH_2$, wherein R is a divalent radical. Such diamines are described extensively and in detail in U.S. Pat. No. 3,891,601, issued June 24, 1975, to M. A. Peterson, et al., for "Process for Producing Water Soluble Polyamide Resins," the disclosure of which is incorporated herein and made a part hereof by this reference.

Suitable solvents for the polyamide-acid reaction product and the reactants are well known as disclosed in the foregoing patents.

The coating composition is conveniently produced as described in Peterson U.S. Pat. Nos. 3,652,500; 3,663,510; and 4,073,788, referred to above. The final coating composition is desirably partially imidized to an imidization level up to about 80% (molar) imidization and preferrably between about 65 and about 75%, and has a high molecular weight, preferably in the range, based on inherent viscosity, of about 0.7 to about 1.0 dl/g.

The following examples illustrate the present invention and the effective blister resistant magnet wire produced. In the examples, appropriate abbreviations are used where convenient:

NMP—N-methyl-2-pyrrolidone
MDA—p,p'-methylenedianiline
BTCDA—1,2,3,4-butanetetracarboxylic dianhydride
PC—propylene carbonate
SC100—hydrocarbon solvent blend
BTDA—3,3',4,4'-benzophenonetetracarboxylic dianhydride
AGTA—4,4'-(2-acetoxy-1,3-glyceryl)bis-anhydrotrimellitate
BPADA—2,2-bis[4-(3,4-dicarboxyphenoxy)phenyl]propane dianhydride
PMDA—pyromellitic dianhydride
ODA—p,p'-oxydianiline
mPDA—m-phenylenediamine
EG—ethylene glycol
DEG—diethylene glycol
TEG—triethylene glycol
DEGBE—diethylene glycol n-butylether
DGEEA—diethylene glycol ethylether acetate

EXAMPLE 1

The following materials were used in the stated amounts:

| Material | Amount |
| --- | --- |
| A NMP | 404 g |
| B BTCDA | 188 g (.949 mole) |
| C MDA | 96 g (.4844 mole) |
| C' MDA | 96 g (.4844 mole) |
| D PC | 825 g |
| E SC100 | 129 g |
| F NMP | 33 g |

Materials A and B were added to a 3 liter stainless steel reactor equipped with an agitator and a thermometer. The mixture was agitated and Material C was added slowly with agitation over a period of 5 minutes, forming a clear solution. Material C' was then added over a period of 5 minutes. The reaction mixture exothermed to 71° C. and was held under agitation for 2 hours. The viscosity was 2080 cps at 71° C. A solution-slurry of BTCDA in NMP was added slowly and with agitation to the reactor while maintaining the temperature at 70°-72° C., causing the viscosity to increase to 3400 cps at 71° C. to provide a "back-titration polymer build-up" as described in U.S. Pat. No. 3,663,510. Approximately 10% (molar basis) MDA, based on the employed BTCDA, was then added, causing the viscosity to drop to 3240 cps at 71° C., thereby endcapping with amine as described in U.S. Pat. No. 3,652,500. Endcapping with amines is utilized because acid terminals would manifest themselves as serious degradation of the film in life testing or aging of the magnet wire. Materials D, E and F were added to yield a clear solution at about 22% solids and 820 cps. The resulting enamel was employed to coat 18 gage 40.3 mil copper wire, using a standard commercial wire enamelling tower. A smooth film having a build of 2.8-3.2 mil was obtained. The film exhibited excellent adhesion, passed snap, and passed 25%+1X flexibility. The resulting magnet wire exhibited 210° C. blister resistance when saturated with refrigerant R-22.

EXAMPLE 2

The following materials were used in the stated amounts:

| Material | Amount |
| --- | --- |
| A NMP | 404 g |
| B MDA | 192 g (.9687 mole) |
| C BTCDA | 96 g (.4844 mole) |
| C' BTCDA | 96 g (.4844 mole) |
| D PC | 825 g |
| E SC100 | 129 g |
| F NMP | 33 g |

Materials A and B were added to a 3 liter stainless steel reactor equipped with an agitator and a thermometer. The mixture was agitated and Material C was added slowly with agitation, forming a clear solution. Material C' was then added over a period of 5 minutes. The reaction mixture exothermed to 71° C. and was held under agitation for 2 hours. The back titration procedure of Example 1 was employed to obtain the desired polymer size and distribution for magnet wire enamels, as indexed by inherent viscosity. Endcapping as described in Example 1 was not used since the back titration was carried out with diamine, resulting in the desired amine terminals. Materials D, E & F were then added to yield a clear solution at about 22% solids and 765 cps. The level of imidization was determined from potentiometric titration and found to be 0–2%. The resulting clear solution was employed to coat 18 gage 40.3 mil copper wire using a standard commercial wire enamelling tower. A smooth film of 2.6–2.9 mil was obtained. Continuity was measured at 0–1 per 100—100 ft. at 3000 v. The wire exhibited 31% elongation at break with flexibility of 1X at the break. The DF measured at 180° C., 60 Hz was 0.91%. The cut-through temperature under a 2000 gram load was 480°–500° C. The heat shock measured after 30 min. at 250° C. passed 1X. The dielectric strength was 15 kv. The magnet wire exhibited blister resistance at 210° C. following saturation with R-22 refrigerant.

EXAMPLE 3

The following materials were used in the stated amounts:

| Material | Amount |
| --- | --- |
| A NMP | 445 g |
| B MDA | 192 g (.9687 mole) |
| C BTCDA | 96 g (.4844 mole) |
| C' BTDA | 156 g (.4844 mole) |
| D PC | 1415 g |
| E SC100 | 163 g |

Materials A and B were added to a 3 liter stainless steel reactor equipped with an agitator and a thermometer. The mixture was agitated and Material C added slowly with agitation forming a clear solution. Material C' was then added slowly over 5 minutes. The reaction mixture exothermed to 58° C. The contents of the reactor was brought up to 80° C. and held under agitation for 2 hours. The back titration procedure of Example 1 was employed to obtain the desired polymer size and distribution for magnet wire enamels, as indexed by inherent viscosity. Endcapping as described in Example 1 was not used since the back titration was carried out with diamine, resulting in the desired amine terminals. Materials D & E were added to yield a clear solution at about 18% solids and 610 cps. The enamel was employed to coat 18 gage 40.3 mil copper using a standard commercial wire tower. The resulting magnet wire had a smooth surface and a film build of 2.9–3.1 mil. The film exhibited excellent adhesion, passed snap, and a flexibility of 25%+1X. The magnet wire when saturated in R-22 refrigerant, exhibited no blisters when plunged into a 210° C. oven.

EXAMPLE 4

The following materials were used in the stated amounts:

| Material | Amount |
| --- | --- |
| A NMP | 780 g |
| B MDA | 192 g (.9687 mole) |
| C BTCDA | 96 g (.4844 mole) |
| C' AGTA | 233.6 g (.4844 mole) |
| D PC | 825 g |
| E SC100 | 129 g |
| F NMP | 33 g |

Materials A and B were added to a 3 liter stainless steel reactor equipped with an agitator and a thermometer. The mixture was agitated and Material C was added slowly with agitation forming a clear solution. Material C' was then added over a period of 5 minutes. The reaction mixture exothermed to 52° C. The contents of the reactor were brought up to and held under agitation at 80° C. for 2 hours. The back titration procedure of Example 1 was employed to obtain the desired polymer size and distribution for magnet wire enamels, as indexed by inherent viscosity. Endcapping as described in Example 1 was not used since the back titration was carried out with diamine, resulting in the desired amine terminals. Materials D, E & F were then added to yield a clear solution at about 23% solids and 880 cps. The imidization level was determined with potentiometric titration and found to be 0–2%. The enamel was employed to coat 18 gage 40.3 mil copper using a standard commercial wire tower. The resulting magnet wire had a smooth surface; flexibility of 25%+2X; film build of 2.8–3.2 mil; and exhibited resistance to blistering at a temperature of 210° C. following saturation with refrigerant R-22.

EXAMPLE 5

The following materials were used in the stated amounts:

| Material | Amount |
| --- | --- |
| A NMP | 404 g |
| B ODA | 194 g (.9688) |
| C BTCDA | 96 g (.4844 mole) |
| C' BTCDA | 96 g (.4844 mole) |
| D PC | 825 g |
| E SC100 | 129 g |
| F NMP | 33 g |

Materials A and B were added to a 3 liter stainless steel reactor equipped with an agitator and a thermometer. The mixture was agitated and Material C was added slowly with agitation forming a clear solution. Material C' was then added over a period of 5 minutes. The reaction mixture exothermed to 68° C. and was held under agitation for 2 hours. The back titration procedure of Example 1 was employed to obtain the desired polymer size and distribution for magnet wire enamels, as indexed by inherent viscosity. Endcapping as described in Example 1 was not used since the back titration was carried out with diamine, resulting in the desired amine terminals. Materials D, E & F were then added to yield a clear solution at about 22% solids and 765 cps. The resulting clear solution was employed to coat 18 gage 40.3 mil copper wire using a standard commercial wire enamelling tower. A smooth film having a build of 2.8–3.2 mil was obtained. The film exhibited excellent adhesion passing snap and 25%+1X flexibility. The magnet wire exhibited excellent blister resistance at 210° C. following saturation with R-22 refrigerant.

EXAMPLE 6

The following materials were used in the stated amounts:

| Material | Amount |
| --- | --- |
| A NMP | 560 g |
| B BTCDA | 274 g (1.3831) |
| C MDA | 140 g (0.705 mole) |
| C' MDA | 140 g (0.705 mole) |
| D nBuOH | 35 g |
| E 28% NH₃ | 175 g |
| F H₂O | 420 g |

Materials A and B were added to a 3 liter stainless steel reactor equipped with an agitator, and a thermometer. The mixture was agitated and Material C was added slowly with agitation forming a clear solution. Material C' was then added over a period of 5 minutes. The reaction mixture exothermed to 76° C. and was held under agitation for 2 hours. The viscosity was 2160 cps at 75° C. While maintaining the reactor temperature 75°-77° C., a solution-slurry of BTCDA in NMP was added slowly with agitaion causing the viscosity to increase to 3540 cps at 76° C., effecting a "back titration polymer build-up" (See. U.S. Pat. No. 3,663,510). Approximately 10% (molar basis) MDA, based on the employed BTCDA, was then added causing the viscosity to drop to 3310 cps ensuring an endcapping with amine (See U.S. Pat. No. 3,652,500). Amine endcapping is utilized to eliminate acid terminals which manifest serious degradation problems in life-testing or aging of the magnet wire. Materials D, E & F were then added to yield a clear solutaion at about 32% solids and 880 cps.

The resulting enamel was employed to coat 18 gage 40.3 mil copper wire, using a standard commercial wire enamelling tower. A smooth 2.8-3.1 mil film build was obtained. The film exhibited excellent adhesion, passing snap, and 25%+2X flexibility. The resulting magnet wire exhibited 210° C. refrigerant R-22 blister resistance.

EXAMPLE 7

The following materials were used in the stated amounts:

| Material | Amount |
| --- | --- |
| A NMP | 560 g |
| B MDA | 280 g (1.41 mole) |
| C BTCDA | 140 g (.705 mole) |
| C' BTCDA | 140 g (.705 mole) |
| D nBuOH | 35 g |
| E 28% NH₃ | 175 g |
| F H₂O | 420 g |

Materials A and B were added to a 3 liter stainless steel reactor equipped with an agitator, and a thermometer. The mixture was agitated and Material C added slowly with agitation formng a clear solution. Material C' was then added over a period of 5 minutes. The reaction mixture exothermed to 76° C. and was held under agitation for 2 hours. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. Materials D, E & F were then added to yield a clear solution at about 32% solids, 995 cps and a pH of 7.4. On additional dilution with water to 22.5% solids, there resulted a solution having a viscosity of 688 cps. This clear enamel was employed to coat 18 gage 40.3 mil copper wire in a conventional wire enamelling tower. There resulted a smooth film of 2.9-3.2 mil build exhibiting excellent adhesion on snapping of the wire which occured at 34% elongation. The flexibility of the wire was 25%+2X. The DF measured 1.3% at 180° C. and 60 Hz. The resulting magnet wire passed the saturated refrigerant R-22 blister resistance test at 210° C., showing no blisters.

EXAMPLE 8

The following materials were used in the stated amounts:

| Material | Amount |
| --- | --- |
| A NMP | 560 g |
| B mPDA | 149.6 g (1.41 mole) |
| C BTCDA | 140 g (.705 mole) |
| C' BTCDA | 140 g (.705 mole) |
| D nBuOH | 35 g |
| E 28% NH₃ | 175 g |
| F H₂O | 420 g |

Materials A and B were added to a 3 liter stainless steel reactore equipped with an agitator, and a thermometer. The mixture was agitated and Material C added slowly with agitation forming a clear solution. Material C' was then added over a period of 5 minutes. The reaction mixture exothermed to 80° C. and was held under agitation for 2 hours. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. Materials D, E & F were then added to yield a clear solution at about 26% solids, 520 cps and pH of 7.6. The enamel was employed to coat 18 gage 40.3 mil copper wire in a conventional wire enamelling tower. There resulted a smooth film of 2.7-3.0 mil build exhibiting excellent adhesion passing snap and 25%+2X flexibility. The DF was 1.1% measured at 180° C. 60 Hz. The resuling magnet wire passed the saturated R-22 blister resistance test at 210° C.

EXAMPLE 9

The following materials were used in the stated amounts:

| Material | Amount |
| --- | --- |
| A EG | 800 g |
| B MDA | 800 g (4.04 mole) |
| C BTCDA | 400 g (2.02 mole) |
| D NMP | 100 g |
| E BTCDA | 400 g (2.02 mole) |
| F 28% NH₃ | 200 g |
| G H₂O | 1864 g |

Materials A and B were added to a 5 liter, 3-neck flask equipped with an agitator, a nitrogen inlet, a thermometer, a Dean Stark trap and a water cooled condenser. The mixture was agitated and sparged with nitrogen to displace air. Material C was added and heat applied to gradually raise the temperature to 90° C. Materials D & E were added and the agitation continued for 30 minutes. The back titration procedure of Example 6 was employed to obtain the desired polymer size and distribution for magnet wire enamels, as indexed by inherent viscosity. Endcapping as described in Example ≠was not used since the back titration was carried out with diamine, resulting in the desired amine terminals. The temperature of the reaction mixture was increased and held at 110°-115° C. for 1 hour, and approximately 60 grams of water of condensation were removed. The partially imidized material was potentiometrically titrated for carboxylic acid and the percent imidization found to be 44%. Materials F and G were added to the reaction mixture to yield a clear solution at about 36% solids, 3000 cps and 8.6 pH. This clear enamel was diluted to 29.6% solids with water resulting in a solution having a viscosity of 840 cps. The solution was employed to coat 18 gage 40.3 mil copper wire in a standard commercial wire tower. There resulted a magnet wire with a smooth 2.8-3.1 mil film build having excellent adhesion and passing 25%+1X flexibility. The DF was 0.95% measured at 220° C. and 60 Hz. The resulting magnet wire exhibited R-22 refrigerant blister resistance at 210° C., showing no blisters.

EXAMPLE 10

The following materials were used in the stated amounts:

| Material | Amount |
| --- | --- |
| A EG | 1600 g |
| B NMP | 200 g |
| C MDA | 1600 g (8.077 mole) |
| D BTCDA | 800 g (4.038 mole) |
| D' BTCDA | 800 g (4.038 mole) |
| E nBuOH | 500 g |
| F 28% NH$_3$ | 440 g |
| G H$_2$O | 3200 g |
| H DEG | 87 g |
| I H$_2$O | 200 g |

Materials A, B and C were added to a 5-liter, 3-neck flask equipped with an agitator, a nitrogen inlet, a thermometer, a Dean Stark trap and a water cooled condenser. The mixture was agitated and sparged with nitrogen to displace air. Material D was added and heat applied to gradually raise the temperature to 90° C. Material D' was added over a period of 5 minutes with agitation. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. The temperature was increased to 110° C., and the reaction mixture was held at 110° C. for about 3 hours. Approximately 170 grams of water of condensation were removed. The partially imidized polymeric material was potentiometrically titrated for carboxylic acid and the percent imidazation was found to be 59%. Materials E, F and G were added to the reaction mixture to yield a clear solution at about 35% solids. Materials H and I were added to 2480 gram sample of this mixture, resulting in a solution having a viscosity of 975 cps at 31% solids. The resulting enamel was employed to coat 18 gage 40.3 mil copper wire using a standard commercial wire enamelling tower. A smooth film having a build of 2.8-3.0 mil was obtained. The film exhibited excellent adhesion, passing snap, and passing, 25%+2X flex. DF was found to be 0.82% at 220° C. and 60 Hz. The dielectric strength was 11.4 kv. The film continuity was 0-1 breaks at 3000 v for 100—100 foot levels. The mandrel pull adhesion test using the standard 2X mandrel was excellent at 11/12, 11/13, 11/12. The needle adhesion using the standard 11 lb weight was perfect at 0, 0, 0, showing no breaks. The repeated scrape abrasion resistance was 112,133,98. The heat shock, 30 minutes at 250° C., passed 2X. The cut-through was 510° C. The magnet wire, when heat aged 100 hrs at 200° C., exhibited a dielectric of 12.0 kv. The magnet wire passed the solvent test of 10 minutes in a 50/50 solution of ethanol/toluene. The coefficient of friction was measured in both a static and a dynamic mode. Static values were 0.18-0.19; dynamic values were 0.25-0.28. Standard magnet wire readings are 0.25-0.28 and 0.27-0.34, respectively (lower values are desirable). The magnet wire exhibited 210° C. blister resistance following saturation with R-22 refrigerant.

In another series of runs at the wire enamelling tower 57.1 mil copper wire and 57.1 mil aluminum wire were coated with the composition described above, and exhibited essentially the same good results described above for the 40.3 mil wire. Specifically, the film build was 1.9-2.0 mil for both copper and aluminum wire with continuity at 1500 v reading 0—0 for consecutive 100—100 foot lengths of wire as produced. Flexibility passed 25%+1X on copper and 15%+1X on aluminum. Heat shock passed 2X on copper after heating 30 minutes at 250° C., and passed 2X on aluminum after heating 30 minutes at 240° C.

EXAMPLE 11

The following materials were used in the stated amounts:

| Material | Amount |
| --- | --- |
| A EG | 1600 g |
| B NMP | 200 g |
| C MDA | 1600 g (8.077 mole) |
| D BTCDA | 800 g (4.038 mole) |
| D' BTCDA | 800 g (4.038 mole) |
| E nBuOH | 500 g |
| F 28% NH | 440 g |
| G H$_2$O | 3200 g |
| H DEG | 41 g |
| I TEG | 83 g |
| J H$_2$O | 300 g |

Materials A, B and C were added to a 5 liter, 3-neck flask equipped with an agitator, a nitrogen inlet, a thermometer, a Dean Stark trap and a water cooled condenser. The mixture was agitated and sparged with nitrogen to displace air. Material D was added and heat applied to gradually raise the temperature to 90° C. Material D' was added over a period of 5 minutes with agitation. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. The temperature increased to 110° C., and the reaction mixture was held at 110° C. for about three hours. Approximately 170 grams of water of condensation were removed. The partially imidized polymeric material was titrated potentiometrically for carboxylic acid and the percent imidization was found to be 59%. Materials E, F and G were added to the reaction mixture to yield a clear solution. Materials H, I and J were added to 2380 g of this mixture resulting in a solution having a viscosity of 610 cps and 29% solids. Magnet wire prepared from this enamel in a standard commercial enamelling tower exhibited a smooth surface with excellent adhesion, passing the snap test, and exhibiting flexibility of 25%+1X at a film build of 2.8–3.1 mil and a DF of 1.0% at 220° C. and 60 Hz. The magnet wire exhibited blister resistance at 210° C. from a condition of saturation with R-22 refrigerant.

EXAMPLE 12

The following materials were used in the stated amounts:

| Material | Amount |
| --- | --- |
| A EG | 1600 g |
| B NMP | 200 g |
| C MDA | 1600 g (8.076 mole) |
| D BTCDA | 800 g (4.038 mole) |
| D' BTCDA | 800 g (4.038 mole) |
| E DEG | 315 g |
| F nBuOH | 485 g |
| G 28% NH$_3$ | 417 g |
| H H$_2$O | 4545 g |
| I DEGBE | 170 g |

Materials A, B and C were added to a 5 liter, 3-neck flask equipped with an agitator, a nitrogen inlet, a thermometer, a Dean Stark trap and a water cooled condenser. The mixture was agitated and sparged with nitrogen to displace air, Material D was added and heat applied to gradually raise the temperature to 90° C. Material D' was added over a period of 5 minutes with agitation. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. The temperature was increased to 112° C., and was allowed to drift to 130° C. in 5 hours. Approximately 175 grams of water of condensation were removed. The partially imidized material was titrated potentiometrically for carboxylic acid and the percent imidization was found to be 58%. Materials E, F, G, and H were added to the reaction mixture to yield a clear solution at about 33% solids. Material I was added to 6300 g of the clear solution, resulting in a clear solution at about 32% solids. The resulting enamel was employed to coat 18 gage 40.3 mil copper wire using a standard commercial wire enamelling tower. A smooth film having a build of 2.9–3.1 mil was obtained. The film passed snap and 25%+1X flexibility. The magnet wire exhibited 210° C. R-22 refrigerant blister resistance; showing no blisters.

EXAMPLE 13

The following materials were used in the stated amounts:

| Material | Amount |
| --- | --- |
| A EG | 80 g |
| B MDA | 80 g (.404 mole) |
| C BTCDA | 40 g (.202 mole) |
| C' BTCDA | 40 g (.202 mole) |
| D DEG | 14.5 g |
| E nBuOH | 25.0 g |
| F 28% NH$_3$ | 22.5 g |
| G H$_2$O | 227 g |

Materials A and B were added to a glass reactor equipped with an agitator, a nitrogen inlet, a thermometer, a Dean Stark trap and a water cooled condenser. The mixture was agitated and sparged with nitrogen to displace air. Material C was added and heat applied to gradually raise the temperature to 106° C. Material C' was added over a period of 5 minutes with agitation. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. The temperature was allowed to rise to 138° C. in about 1 hour. Materials D, E, F and G were added to the reaction mixture to yield a clear solution at about 29.5% solids. Magnet wire prepared from this enamel exhibited a smooth surface with excellent adhesion, passing the snap test and exhibiting flexibility of 25%+2X at a film build of 2.7–3.0 mil and DF of 0.95% at 180° C. 60 Hz. The resulting magnet wire exhibited 210° C. blister resistance from a condition of saturation with R-22 refrigerant.

EXAMPLE 14

The following materials were used in the stated amounts:

| Material | Amount |
| --- | --- |
| A DGEEA | 80 g |
| B MDA | 80 g (.404 mole) |
| C BTCDA | 40 g (.202 mole) |
| C' BTCDA | 40 g (.202 mole) |
| D DEG | 145 g |
| E nBuOH | 24 g |
| F 28% NH$_3$ | 22 g |
| G H$_2$O | 227 g |
| H NMP | 10 g |

Materials A and B were added to a glass reactor equipped with an agitator, a nitrogen inlet, a thermometer, a Dean Stark trap and a water cooled condenser. The mixture was agitated and sparged with nitrogen to displace air. Material C was added and heat applied to gradually raise the temperature to 111° C. over a period of 1.5 hours. Material C' was added over a period of 5 minutes with agitation. The back titration procedure of Example 6 was employed to attain the desired polymer size and distribution for magnet wire enamels, as indexed by inherent viscosity. Endcapping as described in Example 6 was not used since the back titration was carried out with diamine, resulting in the desired amine terminals. The reaction temperature was increased to 136° C. over 3 hours. Materials D, E, F, G and H were added to the reaction mixture to yield a clear solution at about 23% solids. Magnet wire prepared from this enamel exhibited a smooth surface with excellent adhesion, passing the snap test, and exhibiting flexibility of 25%+2X at a film build of 2.9–3.2 mil and DF of 1.4% at 180° C. and 60 Hz. The magnet wire exhibited 210° C.

blister resistance from a condition of saturation with R-22 refrigerant.

EXAMPLE 15

The following materials were used in the stated amounts:

| Material | Amount | |
| --- | --- | --- |
| A EG | 1200 g | |
| B NMP | 130 g | |
| C MDA | 1200 g | (6.058 mole) |
| D BTCDA | 600 g | (3.029 mole) |
| D' BTCDA | 600 g | (3.029 mole) |
| E nBuOH | 265 g | |
| F 28% NH$_3$ | 250 g | |
| G H$_2$O | 3245 g | |
| H DEG | 217 g | |

Materials A, B and C were added to a 5-liter, 3-neck flask equipped with an agitator, a nitrogen inlet, a thermometer, a Dean Stark trap and a water cooled condenser. The mixture was agitated and sparged with nitrogen to displace air. Material D was added and heat applied to gradually raise the temperature to 90° C. Material D' was added over a period of 5 minutes with agitation. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. The temperature was increased to 105° C., and thereafter was gradually increased to 128° C. in 1.5 hours and held for 1 hour. Approximately 150 grams of water of condensation were removed. The partially imidized polymeric material was potentiometrically titrated for carboxylic acid and the percent imidization was found to be 82%. Materials E, F, G and H were added to the reaction mixture to yield a clear solution at about 32% solids, a viscosity of 560 cps, and a pH of 7.3. This enamel was employed to coat 0.0403 copper wire and exhibited excellent magnet wire properties; however, on standing gel particles were observed in the enamel suggesting 82% imidization is just beyond a practical polymer for wire enamelling applications.

EXAMPLE 16

The following materials were used in the stated amounts:

| Material | Amount | |
| --- | --- | --- |
| A EG | 1200 g | |
| B NMP | 150 g | |
| C MDA | 1200 g | (6.058 mole) |
| D BTCDA | 600 g | (3.029 mole) |
| D' BTCDA | 600 g | (3.029 mole) |
| E nBuOH | 265 g | |
| F 28% NH$_3$ | 231 g | |
| G H$_2$O | 3250 g | |
| H DEG | 217 g | |

Materials A, B and C were added to a 5-liter, 3-neck flask equipped with an agitator, a nitrogen inlet, a thermometer, a Dean Stark trap and a water cooled condenser. The mixture was agitated and sparged with nitrogen to displace air. Material D was added and heat applied to gradually raise the temperature to 90° C. Material D' was added over a period of 5 minutes with agitation. The back titration procedure of Example 6 was employed to obtain the desired polymer size and distribution for magnet wire enamels, as indexed by inherent viscosity. Endcapping as described in Example 6 was not used since the back titration was carried out with diamine, resulting in the desired amine terminals. The temperature was increased to 118° C., and was thereafter gradually increased to 140° C. in 1.5 hours, and held to 140° C. for 0.5 hour. Approximately 160 grams of water of condensation were removed. The partially imidized polymeric material was potentiometrically titrated for carboxylic acid and the percent imidization found to be 74%. Materials E, F, G and H were added to the reaction mixture to yield a clear solution at about 32% solids, a viscosity of 850 cps, and a pH of 7.4 This enamel was employed to coat 0.0403 copper wire and exhibited excellent magnet wire properties including refrigerant R-22 blister resistance at 210° C., without any evidence of a gelling shelf life problem suggesting 74% imidization is a practical upper limit on the imidization value. Of course, the further one can carry a reaction in the reactor, the wider the operating window becomes in a practical wire enamelling operation.

EXAMPLE 17

The following materials were used in the stated amounts:

| Material | Amount | |
| --- | --- | --- |
| A MMP | 1202 g | |
| B MDA | 192 g | (.9687 mole) |
| C BTCDA | 96 g | (.4844 mole) |
| C' PMDA | 94 g | (.4844 mole) |
| D PC | 423 g | |
| E SC100 | 129 g | |
| F NMP | 33 g | |

Materials A and B were added to a 3 liter stainless steel reactor equipped with an agitator and a thermometer. The mixture was agitated and Material C was added slowly with agitation forming a clear solution. Material C' was then added over a period of one hour. The contents of the reactor were brought up to and held under agitation at 60° C. for 6 hours. The back titration procedure of Example 1 was employed to obtain the desired polymer size and distribution for magnet wire enamels, as indexed by inherent viscosity. Endcapping as described in Example 1 was not used since the back titration was carried out with diamine, resulting in the desired amine terminals. Materials D, E and F were then added to yield a clear solution at about 18% solids and a viscosity of 600 cps. The imidization level was determined with potentiometric titration and found to be 0-2%. The enamel was employed to coat 18 gage 40.3 mil copper wire. The resulting magnet wire had a smooth surface; a flexibility of 25%+2X; a film build of 2.8-3.2 mil, and exhibited blister resistance at a temperature of 210° C. following saturation with R-22 refrigerant.

EXAMPLE 18

The following materials were used in the stated amounts:

| Material | Amount | |
| --- | --- | --- |
| A MMP | 1202 g | |
| B MDA | 192 g | (.9687 mole) |
| C BTCDA | 96 g | (.4844 mole) |

-continued

| Material | Amount |
|---|---|
| C' BPA-DA | 252 g (.4844 mole) |
| D PC | 423 g |
| E SC100 | 129 g |
| F NMP | 33 g |

Materials A and B were added to a 3 liter stainless steel reactor equipped with an agitator and a thermometer. The mixture was agitated and Material C was added slowly with agitation forming a clear solution. Material C' was then added over a period of 5 minutes. The reaction mixture exothermed to 50° C. The contents of the reactor were brought up to and held under agitation at 80° C. for 2 hours. The back titration procedure of Example 1 was employed to obtain the desired polymer size and distribution for magnet wire enamels, as indexed by inherent viscosity. Endcapping as described in Example 1 was not used since the back titration was carried out with diamine, resulting in the desired amine terminals. Materials D, E and F were then added to yield a clear solution at about 24% solids and a viscosity of 790 cps. The imidization level was determined with potentiometric titration and found to be 0-2%. The enamel was employed to coat 18 gage 40.3 mil copper wire. The resulting magnet wire had a smooth surface; flexibility of 25%+2X; a film build of 2.8-3.2 mil, and exhibited blister resistance at a temperature of 210° C. following saturation with R-22 refrigerant.

Such devices as motors, electrical inductive devices, and the like produced from or incorporating magnet wire or other substrates having an enamel coating formed as the reaction product of 1,2,3,4-butanetetracarboxylic dianhydride and a diamine, find particular but not necessarily exclusive utility in hermetic atmospheres which incorporate or include halogenated refrigerant compositions such as refrigerants R-22, R-12, and the like, particularly where the motor is subject to saturation with the halogenated compound and the temperature of the device can reach as high as about 210° C. The enamel coating under such operation conditions does not blister thereby substantially increasing the life and utility of the device. Applicants have discovered a new and unique and unobvious use for the enamel composition herein described. Magnet wire enamel coating compositions produced as described in the foregoing examples finds utility in dual enamel coatings as described in copending application Ser. No. 721,071, filed Apr. 8, 1985, by M. A. Peterson and R. E. Zauner, for "Magnet Wire and Method of Using the same," (Docket 03-LO-5928). The disclosure of that application is incorporated herein by this reference.

Magnet wire is produced from the foregoing compositions by coating copper or aluminum wire in a commercial wire tower or other appropriate wire coating apparatus, in a manner well known in the art. Following the preparation of the magnet wire, the magnet wire is wound into coils which are incorporated in or form a part of an electrical inductive device such as a dynamoelectric machine or motor.

Other surfaces of devices such as electrical devices can be provided with protective coatings of the above-described character. For example, coatings can be provided on slot walls, selected corners and edges of a magnetic core, and other surfaces of an electromotive device such as an electrical motor.

The devices such as electrical devices, electrical inductive devices, motors and the like having wire and other substrates coated with the above materials are useful in hermetic atmospheres incorporating halogenated refrigerants where the device is operated or subject to operation at temperatures as high as 200° to 210° C. or possibly higher. A commercial type wire tower is shown for example in U.S. Pat. No. 2,868,159, issued Jan. 13, 1959, to H. B. Lit, et al., for "Wire Coating Apparatus." An apparatus for producing a protective coating on the surface of a manufactured article such as an electrical motor is shown in U.S. Pat. No. 3,607,553 issued Sept. 21, 1971, to H. L. Fritzsche, for "Apparatus for Producing a Protective Coating on the Surface of a Manufactured Article." Coil winding machinery and wound coil devices are of course well known in the art. High speed flyer winders are described in U.S. Pat. No. 3,964,525, issued June 22, 1976, to R. B. Arnold et al. for "Mechanism for Use in Winding Apparatus," which covers shedder winder type apparatus, specifically, vertical injection coil winders and injection modular coil winders.

While illustrative embodiments of the present invention have been described herein in considerable detail, it should be understood that the invention is to be limited only by the scope and content of the appended claims.

We claim:

1. A method of making a wound coil electrical inductive device for use in an hermetic atmosphere including a halogenated refrigerant, comprising forming magnet wire by coating a wire substrate with a wire enamel coating composition consisting essentially of a polyamide acid reaction product of a diamine and a dianhydride selected from the group consisting of 1,2,3,4-butanetetracarboxylic dianhydride and 1,2,3,4-butanetetracarboxylic dianhydride in admixture with a dianhydride selected from the group consisting of aromatic and cyclic dianhydrides, in a solvent, curing said wire enamel coating composition on said wire to form magnet wire including a cured enamel coating, and winding said magnet wire into coils embodied in an electromagnetic device, said device being useful in an hermetic atmosphere including a halogenated refrigerant under saturation conditions, and at temperatures up to and above about 210° C., without blistering said wire enamel.

2. A method as defined in claim 1 wherein said wire enamel coating composition is produced by reacting substantially equimolar amounts of 1,2,3,4-butanetetracarboxylic dianhydride and an aromatic diamine in a suitable solvent to form a wire enamel coating composition.

3. A method of making a device for use in an hermetic atmosphere which includes a halogenated compound, comprising forming an enamel coated substrate by coating said substrate with an enamel coating composition consisting essentially of a polyamide acid reaction product of 1,2,3,4-butanetetracarboxylic dianhydride and a diamine in a solvent, curing said enamel coating composition on said substrate to form a cured enamel coating thereon, and incorporating said substrate into a device, said device being useful in an hermetic atmosphere including a halogenated compound under saturation conditions, and at temperatures up to and above about 210° C. without blistering said enamel coating.

4. A method as defined in claim 3 wherein said enamel coating composition is produced by reacting substantially equimolar amounts of 1,2,3,4-butanetetracarboxylic dianhydride and an aromatic diamine in a suitable solvent to form an enamel coating composition.

5. In an electrical device for use in an hermetic atmosphere including a halogenated refrigerant, an enamel coated substrate having resistance to blistering when exposed to a halogenated refrigerant under saturation conditions at a temperature in the range up to about 210° C., said coated substrate comprising a metal substrate having an enamel coating thereon consisting essentially of a cured polyamide-acid reaction of 1,2,3,4-butane tetracarboxylic dianhydride and an aromatic diamine; said device incorporating said enamel coated substrate and being adapted for operation in an hermetic atmosphere including a halogenated refrigerant at a temperature up to about 210° C.

6. In a wound coil electrical inductive device, magnet wire forming a wound coil and having resistance to blistering when exposed to a halogenated refrigerant under saturation conditions at a temperature in the range up to about 210° C., said magnet wire comprising a wire substrate having an enamel coating thereon consisting essentially of a cured polyamide acid reaction product of 1,2,3,4-butane tetracarboxylic dianhydride and a diamine, said wire being wound into coils and incorporated into said electromagnetic device, said device being adapted for operation in an hermetic atmosphere including a halogenated refrigerant at a temperature up to about 210° C.

7. In an electrical device as defined in claim 6, said wire substrate being selected from the group consisting of aluminum wire and copper wire.

8. A method of making an electrical inductive device for use in an hermetic atmosphere which includes a halogenated compound, comprising forming magnet wire by coating a wire substrate with a wire enamel coating composition consisting essentially of a polyamide coating composition produced by a process comprising the steps of:
  (a) dissolving an anhydrous carbocyclic dianhydride and an aromatic diprimary diamine in the molar ratio of dianhydride to diamine of 2:1, in an organic solvent which is a solvent for the reaction product of said dianhydride and said diamine;
  (b) reacting at a temperature below the imidization temperature, said dianhydride and said diamine to form a stable precursor bis-amide of the general formula XYX, wherein:
  X is

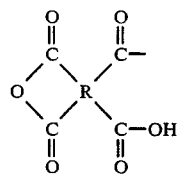

Y is —NH—R'—NH—,
  R is a carbocyclic radical selected from the group consisting of the 1,2,3,4-butanetetracarboxylic radical and a mixture of the 1,2,3,4-butane tetracarboxylic radical and an aromatic radical, and
  R' is an aromatic radical;
  (c) adding a solution of phase molar ratio excess of said diamine (Y) to the XYX;
  (d) thereafter slowly back-titrating at a temperature below the imidization temperature the product formed in step (c) with said dianhydride to react with the terminal diamine groups to approach a 1/1 ratio of said dianhydride to said diamine;
  (e) encapping the reaction product with a reactant selected from the group consisting of aniline and a difunctional diprimary diamine, to react with carbocyclic anhydride end groups and providing thereby a coherent and adherent coating material;
  (f) and thereafter imidizing the product formed in step (e) to a range between 0 and 74% by holding the product of step (e) above an appropriate imidization temperature;
curing said wire enamel coating composition on said wire to form magnet wire including a cured enamel coating, and incorporating said magnet wire into an electrical device, said device being useful in an hermetic atmosphere including a halogenated compound under saturation conditions, and at temperatures up to about 210° C., without blistering said enamel.

9. A method of making an electrical inductive device for use in an hermetic atmosphere which includes a halogenated compound, comprising forming magnet wire by coating a wire substrate with a wire enamel coating composition consisting essentially of a polyamide coating composition produced by a process comprising the steps of:
  (a) dissolving an anhydrous carbocyclic dianhydride and an aromatic diprimary diamine in the molar ratio of dianhydride to diamine of 1:2, in an organic solvent which is a solvent for the reaction product of said dianhydride and said diamine;
  (b) reacting at a temperature below the imidization temperature said dianhydride and said diamine to form a stable precursor bis-amide of the general formula YXY, wherein:
  X is

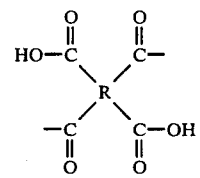

Y is —NH—R'—NH2
  R is a carbocyclic radical selected from the group consisting of the 1,2,3,4-butanetetracarboxylic radical and a mixture of the 1,2,3,4-butanetetracarboxylic radical and an aromatic radical, and
  R' is an aromatic radical;
  (c) adding a solution of phase molar ratio excess of said dianhydride (X) to the YXY;
  (d) and thereafter slowly back-titrating at a temperature below 50° C. the product formed in step (c) with said diamine to react with the terminal anhydride groups to approach a 1/1 ratio of said dianhydride to said diamine;
  (e) and thereafter imidizing the product formed in step (d) to a range between 0 and 74% by holding the product of step (d) above an appropriate imidization temperature;
curing said wire enamel coating composition on said wire to form magnet wire including a cured enamel coating, and incorporating said magnet wire into an electrical device, said device being useful in an hermetic atmosphere including a halogenated compound under saturation conditions, and at temperatures up to about 210° C., without blistering said enamel.

10. A method of making an electrical inductive device as defined in claim 1, wherein said aromatic dianhydride is selected from the group consisting of
3,3',4,4'-benzophenonetetracarboxylic dianhydride, pyromellitic dianhydride,
4,4'-(2-acetoxy-1,3-glyceryl)bis-anhydrotrimellitate, and
2,2-bis[4-(3,4-dicarboxyphenoxy)phenyl]propane dianhydride.

11. A method of making a wound coil electrical inductive device as defined in claim 1 wherein said aromatic dianhydride is selected from the group consisting of
3,3',4,4'-benzophenonetetracarboxylic dianhydride, pyromellitic dianhydride,
4,4'-(2-acetoxy-1,3-glyceryl)bis-anhydrotrimellitate, and
2,2-bis[4-(3,4-dicarboxyphenoxy)phenyl]propane dianhydride.

12. A method of making an electrical inductive device as defined in claim 1 wherein said solvent comprises N-methyl-2-pyrrolidone.

13. A method of making wound coil electrical inductive device as defined in claim 1 wherein said solvent comprises N-methyl-2-pyrrolidone.

14. A method of making an electrical inductive device as defined in claim 8, including the step of adding nitrogen-containing base to said bis-amide formed in step (f) to preclude conversion of same to a gel and to render same water soluble.

15. A method of making an electrical inductive device as defined in claim 9, including the step of adding nitrogen-containing base to said bis-amide formed in step (e) to preclude conversion of same to a gel and to render same water soluble.

16. A wire enamel coating composition comprising a polyamide coating composition produced by a process consisting essentially of the steps of:
  (a) dissolving an anhydrous carbocyclic dianhydride and an aromatic diprimary diamine in the molar ratio of dianhydride to diamine of 2:1 in an organic solvent which is a solvent for the reaction product of said dianhydride and said diamine;
  (b) Reacting at a temperature below the imidization temperature, said dianhydride and said diamine to form a stable precursor bis-amide of the general formula XYX, wherein:
  X is

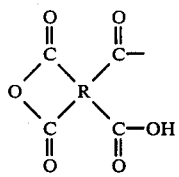

Y is —NH—R'—NH—,
  R is a carbocyclic radical selected from the group consisting of the 1,2,3,4-butanetetracarboxylic radical and a mixture of the 1,2,3,4-butane tetracarboxylic radical and an aromatic radical, and
  R' is an aromatic radical;
  (c) adding a solution of molar ratio excess of said diamine (Y) to the XYX;
  (d) thereafter slowly back-titrating at a temperature below the imidization temperature the product formed in step (c) with said dianhydride to react with the terminal diamine groups to approach a 1/1 ratio of said dianhydride to said diamine;
  (e) encapping the reaction product with a reactant selected from the group consisting with aniline and a difunctional diprimary diamine, to react with carbocyclic anhydride end groups and providing thereby a coherent and adherent coating material;
  (f) and thereafter imidizing the product formed in step (e) to a range between 0 and 74% by holding the product of step (e) above an appropriate imidization temperature.

17. A wire enamel coating composition comprising a polyamide coating composition produced by a process consisting essentially of the steps of:
  (a) Dissolving an anhydrous carbocyclic dianhydride and an aromatic diprimary diamine in the molar ratio of dianhydride to diamine of 1:2 in an organic solvent which is a solvent for the reaction product of said dianhydride and said diamine;
  (b) reacting at a temperature below the imidization temperature said dianhydride and said diamine to form a stable precursor bis-amide of the general formula YXY, wherein:
  X is

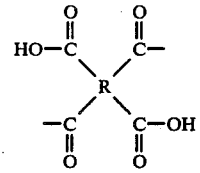

Y is —NH—R'—NH$_2$;
  R is a carbocyclic radical selected from the group consisting of the 1,2,3,4-butanetetracarboxylic radical and a mixture of the 1,2,3,4-butanetetracarboxylic radical and an aromatic radical; and
  R' is an aromatic radical;
  (c) adding a solution of molar ratio excess of said dianhydride (X) to the YXY;
  (d) thereafter slowly back-titrating at a temperature the product formed in step (c) with said diamine to react with the terminal anhydride groups to approach a 1/1 ratio of said dianhydride to said diamine.
  (e) and thereafter imidizing the product formed in step (d) to a range between 0 and 74% by holding the product of step (d) above an appropriate imidization temperature.

18. A coating composition as defined in claim 16 wherein the aromatic diprimary diamine is selected from the group consisted of p,p'-methylenedianiline, p,p'-oxydianiline, and m-phenylenediamine.

19. A coating composition as defined in claim 16 wherein the aromatic dianhydride radical is selected from the group consisting of:
3,3',4,4'-benzophenonetetracarboxylic dianhydride, pyromellitic dianhydride,
4,4'-(2-acetoxy-1,3-glyceryl)bis-anhydrotrimellitate, and
2,2'-bis[4-(3,4-dicarboxyphenoxy)phenyl]propane dianhydride.

20. A coating composition as defined in claim 16, including the step of adding nitrogen-containing base to said bis-amide formed in step (f) to preclude conversion of same to a gel and to render same water soluble.

21. A coating composition as defined in claim 16 wherein said solvent comprises N-methyl-2-pyrrolidone.

22. A coating composition as defined in claim 17 wherein the aromatic diprimary diamine is selected from the group consisted of p,p'-methylenedianiline, p,p'-oxydianiline, and m-phenylenediamine.

23. A coating composition as defined in claim 17 wherein the aromatic dianhydride radical is selected from the group consisting of:
3,3',4,4'-benzophenonetetracarboxylic dianhydride, pyromellitic dianhydride,
4,4'-(2-acetoxy-1,3-glyceryl)bis-anhydrotrimellitate, and
2,2'-bis[4-(3,4-dicarboxyphenoxy)phenyl]propane dianhydride.

24. A coating composition as defined in claim 17, including the step of adding nitrogen-containing base to said bis-amide formed in step (e) to preclude conversion of same to a gel and to render same water soluble.

25. A coating composition as defined in claim 17 wherein said solvent comprises N-methyl-2-pyrrolidone.

* * * * *